United States Patent
Cane et al.

(10) Patent No.: US 6,754,827 B1
(45) Date of Patent: Jun. 22, 2004

(54) SECURE FILE ARCHIVE THROUGH ENCRYPTION KEY MANAGEMENT

(75) Inventors: David Cane, Sudbury, MA (US); David Hirschman, Sharon, MA (US); Philip Speare, Arlington, MA (US); Lev Vaitzblit, Concord, MA (US)

(73) Assignee: Connected Corporation, Framingham, MA (US)

( * ) Notice: Subject to any disclaimer, the term of this patent is extended or adjusted under 35 U.S.C. 154(b) by 0 days.

(21) Appl. No.: 09/314,326

(22) Filed: May 19, 1999

Related U.S. Application Data

(63) Continuation of application No. 09/014,830, filed on Jan. 28, 1998, now Pat. No. 5,940,507.
(60) Provisional application No. 60/037,597, filed on Feb. 11, 1997.

(51) Int. Cl.[7] .................................................. G06F 11/30
(52) U.S. Cl. ........................ 713/193; 713/201; 713/150
(58) Field of Search ................................ 713/193, 201, 713/150; 707/200, 204

(56) References Cited

U.S. PATENT DOCUMENTS

| | | | | |
|---|---|---|---|---|
| 5,416,840 A | | 5/1995 | Cane et al. ..................... 380/4 |
| 5,479,654 A | | 12/1995 | Squibb | |
| 5,559,991 A | * | 9/1996 | Kanfi | |
| 5,584,022 A | * | 12/1996 | Kikuchi et al. | |
| 5,646,993 A | * | 7/1997 | Aizawa ....................... 705/57 |
| 5,654,950 A | * | 8/1997 | Itoh ........................... 369/84 |
| 6,134,660 A | * | 10/2000 | Boneh et al. ............... 713/193 |

* cited by examiner

*Primary Examiner*—Kim Vu
*Assistant Examiner*—James Seal
(74) *Attorney, Agent, or Firm*—Weingarten, Schurgin, Gagnebin & Lebovici LLP

(57) ABSTRACT

An information processing system providing archive/backup support with privacy assurances by encrypting data stored thereby. Data generated on a source system is encrypted, the key used thereby is separately encrypted, and both the encrypted data and encrypted key are transmitted to and maintained by a data repository system. The repository system receives only the encrypted data and key, while the source system retains the ability to recover the key and in turn, the data. The source system is therefore assured of privacy and integrity of the archived data by retaining access control yet is relieved of the physical management of the warehousing medium.

44 Claims, 3 Drawing Sheets

SECURE FILE ARCHIVE THROUGH ENCRYPTION KEY MANAGEMENT

CROSS REFERENCE TO RELATED APPLICATIONS

This application is continuation of U.S. patent application Ser. No. 09/014,830 entitled SECURE FILE ARCHIVE THROUGH ENCRYPTION KEY MANAGEMENT, filed Jan. 28, 1998, now U.S. Pat. No. 5,940,507 and U.S. Provisional Patent Application No. 60/037,597, entitled FILE COMPARISON FOR DATA BACKUP AND FILE SYNCHRONIZATION, filed Feb. 11, 1997.

STATEMENT REGARDING FEDERALLY SPONSORED RESEARCH OR DEVELOPMENT

Not Applicable

FIELD OF THE INVENTION

The present invention relates to data archive operations for information processing systems, and more particularly to security features for such operations.

BACKGROUND OF THE INVENTION

In an information processing system periodic archival of static, unused objects is desirable to optimize access to more active items and to guard against failure such as disk head crashes and human error such as accidental deletions. Consequently, periodic backups to magnetic tape and corresponding purging of selected files from online disks is a common practice.

Data archival mechanisms need to assure the integrity of data stored thereby. Users of the data need to know data is persistent, and also that there is a reasonable turnaround time for retrieval. Often this entails copying such data entities, hereinafter files, to an inexpensive, high volume, but not necessarily fast access, form of physical storage such as magnetic tape. Corresponding index information regarding the magnetic tape location of a particular file can be retained online. Since index information referencing a file consumes much less storage than the file itself, such information is not as unwieldy as the actual data file counterpart. In order to retrieve a file, the index is consulted to determine the physical volume of the corresponding file. The physical magnetic tape volume is then searched for the desired entity. Although sequential, this aspect of the search can be performed within a reasonable time since the indexing system has narrowed the field to a single volume. Such indexing schemes are numerous and are well known to those skilled in the art.

Images written to magnetic tape, however, remain fixed and readable unless physically overwritten. Successive revisions of backups tend to render the previous versions obsolete, although the earlier versions still exist on the tape. Such a tape might well be discarded, thereby placing it in the public domain, or partially used for another purpose, leaving an uncertain status of the information which may exist randomly and unprotected. Further attenuation of control over the data occurs when another party performs the archive. Since the archiving operation usually bears little relation to the generation of the data, it is often desirable to delegate this operation. The archive operation may be undertaken by a colocated group, a group at a remote location of the same organization, or an external contractor, and could involve either electronic or physical mediums of data transmission. Delegation of the backup operation to an archive server, however, raises issues of security and privacy, since the corporation or individual generating the data (hereinafter source organization) has little control over access to the data at a remote facility. With regard to file deletion, however, magnetic tape does not lend itself well to selective rewrite. Due to the sequential nature of magnetic tape, intra-tape modifications can compromise subsequent files. It is therefore difficult for an archive service to ensure integrity of data upon retrieval requests, provide effective deletion of obsolete data, and maintain secrecy of data while under the control of the archive mechanism.

BRIEF SUMMARY OF THE INVENTION

The present invention addresses the problem of privacy for archived data by providing the source organization with control over the data without burdening the reliability of retrieval with the problems caused by sequential overwrite. An encryption function applied to the archived data renders it in a form unintelligible to unauthorized observers. Encryption involves arithmetic manipulations of the data using a specific value called a key, which renders the data in an unintelligible form. This key bears a specific mathematical relationship to the data and the encryption algorithm being used. Returning the data to the original form involves applying the corresponding inverse function to the encrypted form. Without the proper key, however, it is very difficult to determine the inverse, or decryption, function. The security provided by encryption rests on the premise that with a sufficiently large key, substantial computational resources are required to determine the original data. Encrypting a file with a particular key, and then encrypting the key itself using a master key, therefore, allows another party to physically maintain and store the data while the originator, or source, of the data retains access control. Additional security and authentication measures can also be taken, such as further encrypting the key or the data at the server with a server key, and the use of cipher block chaining to impose dependencies among a sequence of file blocks.

In accordance with the present invention, an archive server utilizes encryption techniques to maintain both security and integrity of stored data by maintaining a series of keys for each archived file, and encrypting both the archived file, and the key to which it corresponds. The archive server manages the encrypted files and the corresponding encrypted keys, while the source organization maintains only the master key required to recover the individual encrypted keys. Through this arrangement, the source organization maintains control and assurances over access to the archived data, while the archive server manages the physical storage medium and performs individual encrypted file manipulation requests at the behest of the client. The archive server maintains access only to the encrypted data files and encrypted keys, effectively managing these files and keys as abstract black-box entities, without the ability to examine and interpret the contents.

Three common transactions involving archived encrypted files are effected by the present invention. A source organization desiring to archive files periodically transfers files from its online repository, usually a fast access storage medium such as a disk, to the archive server. To retrieve archived information, a retrieval transaction indicating a particular file occurs. Finally, when an item is to be deleted, a deletion instruction implicating a particular file is issued to the archive server.

One benefit provided by this arrangement is the elimination of access to data by the archive server, therefore providing the source organization with assurances of access control and privacy, while relieving the source organization of archive cataloging and physical storage duties. Furthermore, effective deletion of information stored on archive tapes is achieved without physical modification to magnetic tape, therefore avoiding compromise to subsequent data on the same volume.

BRIEF DESCRIPTION OF SEVERAL VIEWS OF THE DRAWING

The invention will be more fully understood in view of the following Detail Description of the Invention and Drawing, of which.

DETAILED DESCRIPTION OF THE INVENTION

U.S. Provisional Patent Application No. 60/037,597 entitled FILE COMPARSION FOR DATA BACKUP AND FILE SYNCHRONIZATION, filed Feb. 11, 1997, is incorporated herein by reference.

Figure 1:
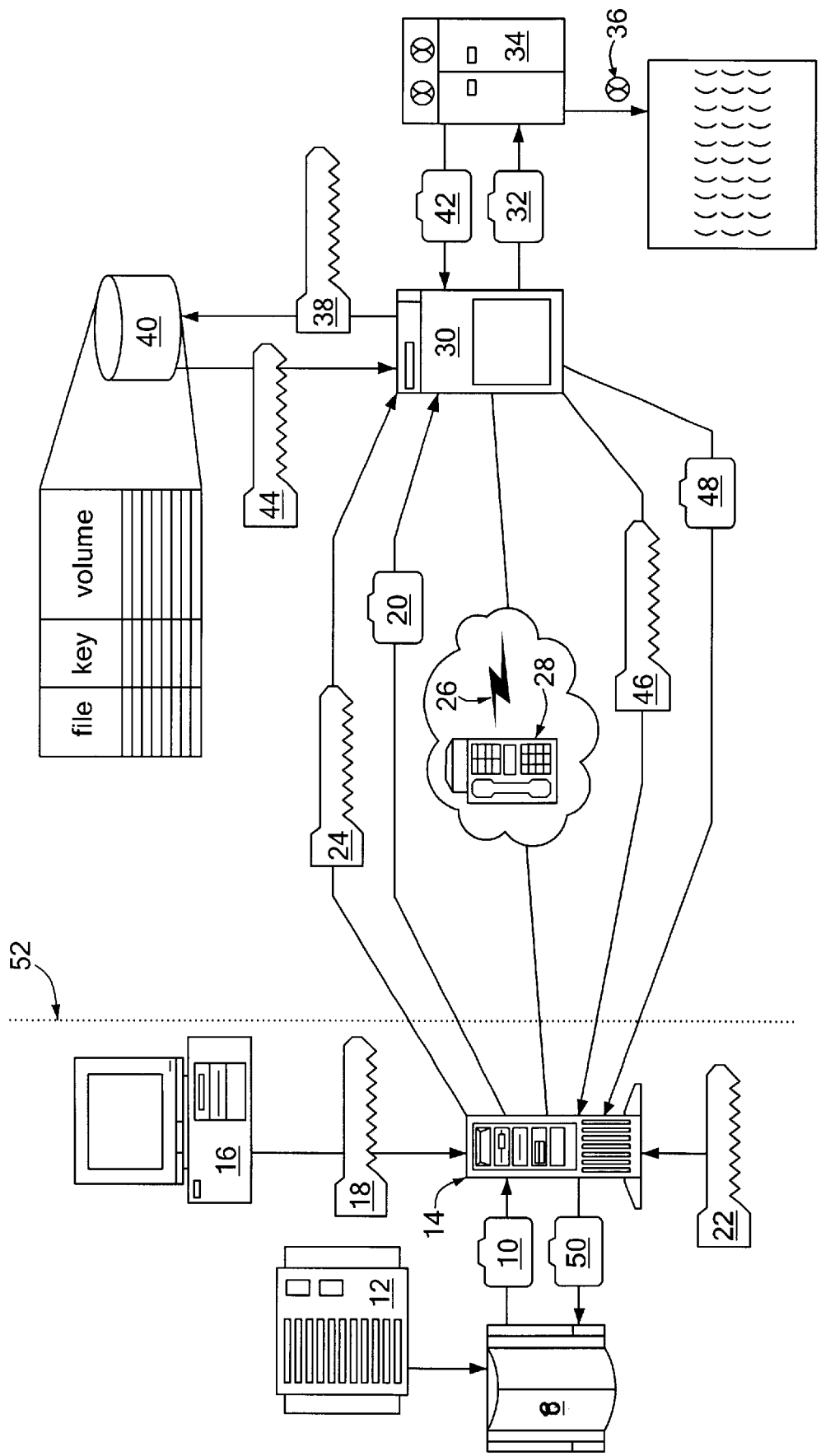
FIG. 1 is a block diagram of the physical information flow.

Referring to FIG. 1, in a computer information processing system large amounts of data are stored and must periodically be archived. Often data is copied from a source system 8 to an archive information processing system 30, herinafter archive server, over a transmission medium, 26 and 28. The archive server 30 then copies the data to be archived onto a suitable long term storage volume such as magnetic tape 36.

An archive transaction for a file stored at the source system encompasses encryption of the file on the source system using a secondary key, encryption of the secondary key on the source system using a master key, and transmission of the encrypted file and associated encrypted key to the archive server. Transmission is electronic via computer network, or in alternative embodiments by physical delivery of a suitable magnetic medium. The archive server then stores the encrypted file on magnetic tape or another medium of long term storage, and stores the encrypted file key along with an index to the tape containing the encrypted file. The master key used to encrypt the secondary key is retained on the source system.

Figure 2:
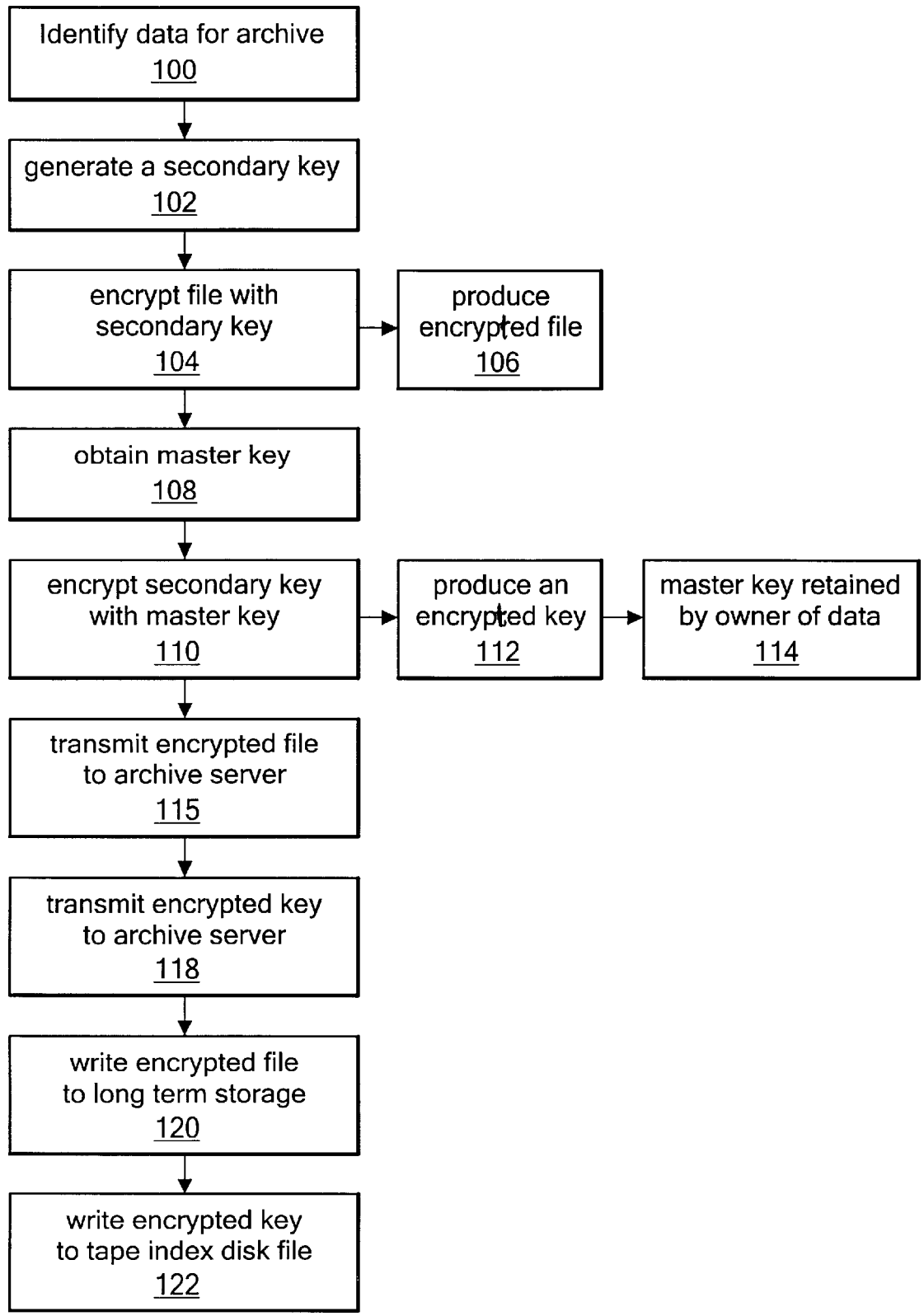
FIG. 2 is a flowchart depicting the archival method.

Referring to FIGS. 1 and 2, A file 10 to be archived is identified 100 within a fast access storage medium 12 of the source information system 8, and is sent to a cryptographic engine 14. The present embodiment incorporates a disk drive as the fast access storage medium, although an alternative embodiment could use other modes of digital fixation, such as CD-ROM. The cryptographic engine 14 may be an application within the same node or an independent CPU, and may invoke specialized encryption hardware, depending on the encryption method desired. Any of various known encryption methods could be employed.

A key generator 16 then generates a secondary key 18 as shown in step 102, and uses this key to encrypt the file 10 as shown in step 104 to produce an encrypted file 20, at step 106. The master encryption key 22 is then obtained in step 108 and used to encrypt the secondary key in 18, as shown at step 110, and produce an encrypted key 24, as indicated in step 112. Note that since the same master key is used to encrypt multiple secondary keys it need be generated only once and then reused for successive secondary keys. The encrypted file 20 and encrypted key 24 are then transmitted to the archive server at steps 116 and 118, respectively, while the master key 22 is retained at the source system 8 at step 114. Transmission may be accomplished via Internet 26, dialup connection 28, or in alternative embodiments, other means such as physical delivery of the storage medium. Encryption may be performed by any of various known methods, such as RSA, DES, and other permutations and may involve authentication and verification either through a trusted third party or mathematical methods. Such authentication and verification may involve cipher block chaining (CBC), to perform an XOR on all or part of a previous block and use the resultant value in encrypting a successive block, or checksums such as cyclic redundancy checks (CRC), MD4, and MD5, which accumulate all values in a particular block according to a mathematical formula to arrive at a value which is highly unlikely to be duplicated if data in the block is changed or lost.

Upon receipt of the encrypted file 20 and the encrypted key 24, the archive server 30 writes the encrypted file 32 to a magnetic tape 36, or other medium of long term storage which is inexpensive and which need not encompass real time access, via tape drive 34 at step 120. The encrypted key 38 is then written to a tape index disk file 40 at step 122, thereby associating the magnetic tape volume 36 with the encrypted file 32 and the encrypted key 38. In alternative embodiments, a further encryption operation may be performed at the archive server on the encrypted file 32 or the encrypted key 38 to add an additional layer of security.

Recovery of a file is accomplished by the archive server referencing the index to obtain the encrypted key and the volume of the encrypted file. The encrypted file is then retrieved from the volume, and both the encrypted file and encrypted key are transmitted back to the client. The client then recovers the file through the same two stage process used to encrypt. First, the secondary key must be recovered by decrypting the encrypted key with the master. Second, the original file may be recovered by decrypting the encrypted file with the secondary key.

Figure 3:
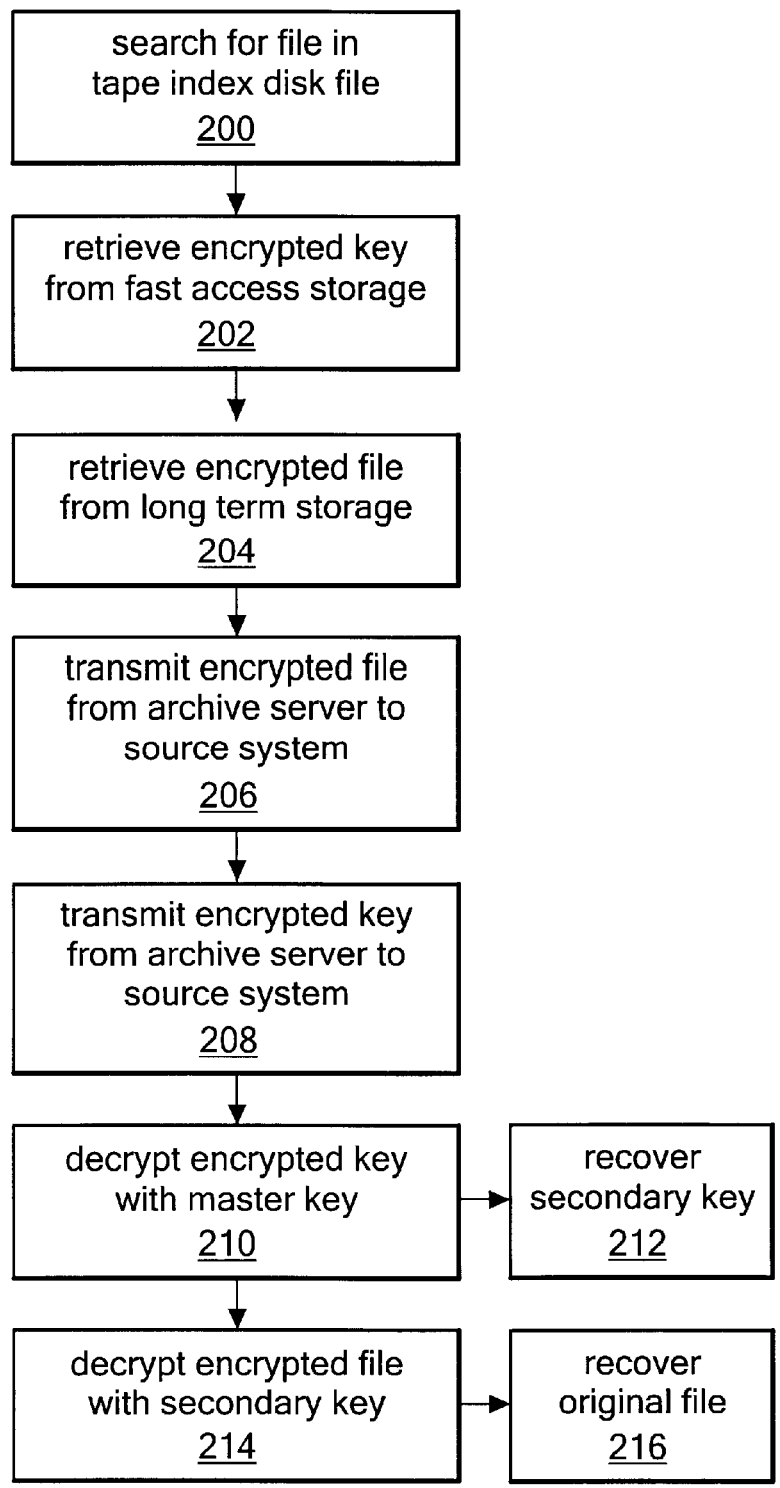
FIG. 3 is a flowchart depicting the retrieval method.

Referring to FIGS. 1 and 3, for file recovery the archive server searches the tape index disk on file 40 at step 200 to lookup encrypted key 44 and the location of the magnetic tape volume 36. The server then retrieves the encrypted key at step 202 and retrieves the encrypted file 42 from long term storage via tape drive 34, as shown in step 204. The encrypted file 48 and encrypted key 46 are then transmitted back to the source system 8 as indicated by steps 206 and 208, respectively.

Once received by the source system 8, the master key 22 is used to decrypt the encrypted key 46 at step 210 and recover the secondary key 18, as shown in step 212. The secondary key 18 is then used to decrypt the encrypted file 48 as shown in step 214 to produce the recovered file 50 which is identical to the original file 10, as indicated by step 216.

File deletion involves searching the tape index disk file 40, for the entry corresponding to the file 10 marked for deletion. Rather than retrieving the key and volume, however, the encrypted key 44 is deleted and the storage area in the tape index disk file 40 overwritten with zero values. This overwriting is required to avoid future access to the encrypted key 44 through use of a sector level disk access, as many file systems merely flag a deleted area as available, and data physically remains unaltered until a subsequent write needs the available space. Elimination of the encrypted key effectively precludes future access to the contents of the archived file stored on magnetic tape without requiring physical modification to the archive volume; only the encrypted key is deleted. Therefore, there is no compromise of the integrity of adjacent entities on the tape, and no extraneous versions of sensitive data.

Following overwrite of the encrypted key 44, the information in the encrypted file 32 remains secure. No modification of the magnetic tape volume 36 is required, as the encryption ensures that the information remains unintelligible.

Effectiveness of this method suggests that the encryption take place no more remotely than the limits of the source system organization's proprietary, or internal, network, as unprotected electronic transfers can also compromise the data. The dotted line 52 on FIG. 1 indicates the extent of unencrypted data and should represent no greater extent than the intranet of the originating entity.

Master key generation is significant because recover of a key allows recovery of the file that the key represents. Consequently, control over access and deletion to archived files is dependent upon control over the corresponding secondary keys. Each key, however, must be unique to the file to which it corresponds, otherwise, exposure of a key to decrypt a particular file compromises that key for all other files which that key covers. If the source system is required to maintain a separate key for all archived encrypted files, however, there is merely a shift in storage medium, as the key to each encrypted file, rather than the file, must be still maintained. Encrypting individual secondary keys allows the keys to be maintained as securely as the files. The source system maintains a single master key, or several master keys covering different groups of secondary keys. Control of the archived, encrypted files is then focused through a master key. The archiving entity retains a set of all encrypted files, and maintains a mapping to the corresponding encrypted keys for which the source organization holds the master key.

Having described the preferred embodiments of the invention, other embodiments which incorporate concepts of the invention will now become apparent to one skilled in the art. Therefore, the invention should not be viewed as limited to the disclosed embodiments, but rather should be viewed as limited only by the spirit and scope of the appended claims.

What is claimed:

1. A file archive system for storing encrypted files on a computer-readable volume, each encrypted file being encrypted according to a corresponding first key, the system comprising:
   an archive server comprising:
      a first memory subsystem configured to store the encrypted files on the computer-readable volume; and
      a second memory subsystem configured to store, for each encrypted file:
         the corresponding first key, according to which the encrypted file was encrypted; and
         information associating the computer-readable volume, on which the encrypted file is stored, with the corresponding first key;
   wherein deletion of a selected first key from the second memory subsystem effectively precludes future decryption of the encrypted file that was encrypted according to the selected first key, without requiring deletion of the encrypted file from the computer-readable volume.

2. The system of claim 1, wherein the second memory stores an index file configured to store at least one entry, each entry being associated with an encrypted file stored by the first memory, each entry including:

the first key, according to which the encrypted file is encrypted;

the information associating the computer-readable volume, on which the encrypted file is stored, with the first key; and an identifier associated with the encrypted file.

3. The system of claim 2, wherein the index file is searchable by the identifier associated with the encrypted file.

4. The system of claim 2, wherein a plurality of encrypted files are encrypted according to the first key.

5. The system of claim 1, wherein the first memory subsystem is distinct from the second memory subsystem.

6. The archive server of claim 5, wherein the computer-readable volume comprises a removable volume.

7. The system of claim 6, wherein the computer-readable volume comprises a sequential access memory.

8. The system of claim 7, wherein the computer-readable volume comprises a magnetic tape.

9. The system of claim 8, wherein the second memory subsystem comprises a random access memory.

10. The system of claim 9, wherein the second memory subsystem comprises a disk memory.

11. The system of claim 1, further comprising a source system:
   connected to the archive server by a computer network link; and
   configured to encrypt a file according to the first key and send the encrypted file, via the computer network link, to the archive server for storage.

12. The system of claim 11, further comprising a key generator configured to generate the first key and provide the first key to the source system.

13. The system of claim 11, further comprising a plurality of source systems.

14. The system of claim 13, further comprising a key generator configured to generate the first key and provide the first key to the plurality of source systems.

15. The system of claim 11, further comprising a cryptographic engine configured to encrypt the first key according to a second key prior to storage of the first key on the second memory.

16. The system of claim 15, wherein the source system is further configured to decrypt the first key according to the second key.

17. The system of claim 16, wherein the source system is further configured to use the decrypted first key to decrypt the encrypted file.

18. The system of claim 15, wherein the archive server is configured to further encrypt the encrypted file.

19. The system of claim 15, wherein the archive server is configured to further encrypt the encrypted first key.

20. The system of claim 1, wherein the archive server is configured to provide:
   a selected encrypted file from the first memory subsystem; and
   a first key, corresponding to the selected encrypted file, from the second memory subsystem.

21. The system of claim 20, further comprising a source system connected to the archive server by a computer network link and configured to:
   receive the provided selected encrypted file and the provided first key; and
   decrypt the provided selected encrypted file according to the provided first key.

22. The system of claim 21, wherein:
the first key is encrypted according to a second key prior to storage on the second memory; and
the source system is further configured to decrypt the first key according to the second key prior to decrypting the provided selected encrypted file.

23. The system of claim 1, wherein the archive server is configured to delete from the second memory subsystem a first key that corresponds to a selected encrypted file, thereby effectively precluding future decryption of the selected encrypted file.

24. The system of claim 23, wherein the archive server is configured to overwrite the first key in the second memory subsystem to delete the first key.

25. The system of claim 1, wherein the first key is encrypted according to a second key prior to storage on the second memory subsystem.

26. The system of claim 25, wherein the first key is decrypted prior to using the first key to decrypt the encrypted file.

27. A method for storing a file on a computer-readable volume, the method comprising:
storing an encrypted file on the computer-readable volume; and
storing a first key, according to which the encrypted file is encrypted, and information associating the computer-readable volume with the first key in a memory subsystem distinct from the computer-readable volume;
wherein deletion of a selected first key from the memory subsystem effectively precludes future decryption of the encrypted file that was encrypted according to the selected first key, without requiring deletion of the encrypted file from the computer-readable volume.

28. The method of claim 27, further comprising:
encrypting the file according to the first key to produce the encrypted file; and
sending the encrypted file over a computer network link to a server for the storing the encrypted file on the computer-readable volume.

29. The method of claim 28, further comprising:
sending the first key over the computer network link for the storing the first key in the memory subsystem.

30. The method of claim 28, further comprising:
generating the first key.

31. The method of claim 28, further comprising:
encrypting a second file according to the first key to produce a second encrypted file;
sending the second encrypted file over the computer network link;
storing the second encrypted file on the computer-readable volume; and
storing an identifier associated with the second encrypted file in the memory subsystem.

32. The method of claim 27:
further comprising encrypting the first key according to a second key to produce an encrypted first key; and
wherein the storing the first key comprises storing the encrypted first key in the memory subsystem.

33. The method of claim 32, further comprising:
decrypting the first key; and
using the decrypted first key to decrypt the encrypted file.

34. The method of claim 32, further comprising:
providing the encrypted file from the computer-readable volume; and
providing the encrypted first key, according to which the encrypted file is encrypted, from the memory subsystem.

35. The method of claim 34, further comprising:
decrypting the encrypted first key; and
using the decrypted first key to decrypt the encrypted file.

36. The method of claim 27, further comprising:
further encrypting the encrypted file prior to storing the encrypted file on the computer-readable volume.

37. The method of claim 27, further comprising:
storing an identifier associated with the encrypted file in the memory subsystem.

38. The method of claim 27, further comprising:
providing the encrypted file from the computer-readable volume; and
providing the first key, according to which the encrypted file is encrypted, from the memory subsystem.

39. The method of claim 38, wherein the encrypted file and the first key are provided via a computer network link.

40. The method of claim 39, further comprising:
receiving the encrypted file and the first key via the computer network link; and
decrypting the received encrypted file according to the received first key.

41. The method of claim 38, wherein:
the providing the encrypted file comprises using the information associating the computer-readable volume with the first key to identify the computer-readable volume, on which the encrypted file is stored.

42. The method of claim 38:
further comprising storing an identifier associated with the encrypted file in the memory subsystem; and
wherein the providing the encrypted file comprises searching for the identifier associated with the encrypted file.

43. The method of claim 27, further comprising:
deleting a selected first key, corresponding to a selected encrypted file stored on the computer-readable volume, from the memory subsystem, thereby effectively precluding future decryption of the selected encrypted file.

44. The method of claim 43, wherein the deleting comprises overwriting the selected first key.

* * * * *